United States Patent
Lioy et al.

(10) Patent No.: US 8,861,368 B2
(45) Date of Patent: Oct. 14, 2014

(54) METHOD AND APPARATUS FOR HANDLING STALE PDN CONTEXT

(75) Inventors: Marcello Vincenzo Lioy, Seattle, WA (US); George Cherian, San Diego, CA (US); Jun Wang, La Jolla, CA (US); Srinivasan Balasubramanian, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 12/949,742

(22) Filed: Nov. 18, 2010

(65) Prior Publication Data

US 2011/0176426 A1 Jul. 21, 2011

Related U.S. Application Data

(60) Provisional application No. 61/262,876, filed on Nov. 19, 2009.

(51) Int. Cl.
*H04L 12/26* (2006.01)
*H04L 12/28* (2006.01)
*H04W 76/04* (2009.01)

(52) U.S. Cl.
CPC .................................... *H04W 76/04* (2013.01)
USPC .......................................... 370/241; 370/254

(58) Field of Classification Search
USPC .................................................. 370/241–253
See application file for complete search history.

(56) References Cited

U.S. PATENT DOCUMENTS 6,993,010 B1\* 1/2006 Peshkin .......................... 370/352
2010/0322106 A1\* 12/2010 Qiang ............................ 370/254

OTHER PUBLICATIONS

U.S. Appl. No. 61/218,640, filed Jun. 19, 2009.\*
3GPP: "3rd Generation Partnership Project; Technical Specification Group Core Network and Terminals; Mobile radio interface Layer 3 specification; Core network protocols," (TS 24.008 V5.16.0, Stage 3, Release 5), Jun. 2006, pp. 4, Section 9.4.15.
3GPP: "3rd Generation Partnership Project; Technical Specification Group Core Network and Terminals; Mobile radio interface Layer 3 specification; Core network protocols," (TS 24.008 V5.16.0, Stage 3, Release 5), Jun. 2006, pp. 5, Section 9.4.14.
ETSI TS 123 060: "Digital cellular telecommunications system (Phase 2+); Universal Mobile Telecommunications System (UMTS); General Packet Radio Service (GPRS); Service description," Stage 2, 3GPP TS 23.060 version 5.13.0 Release 5, Dec. 2006, pp. 203.

\* cited by examiner

*Primary Examiner* — Afshawn Towfighi
(74) *Attorney, Agent, or Firm* — Kristine U. Ekwueme

(57) ABSTRACT

Apparatus and methods are described herein for managing data network connections. When a gateway or user equipment receives a message indicating the active data network connections associated with the sending party, the gateway or user equipment checks a locally stored list of active data network connections to determine whether there is a match. If at least one active data network connection does not match, the receiving device sends a message to the sending party indicating the locally stored active data network connections.

28 Claims, 10 Drawing Sheets

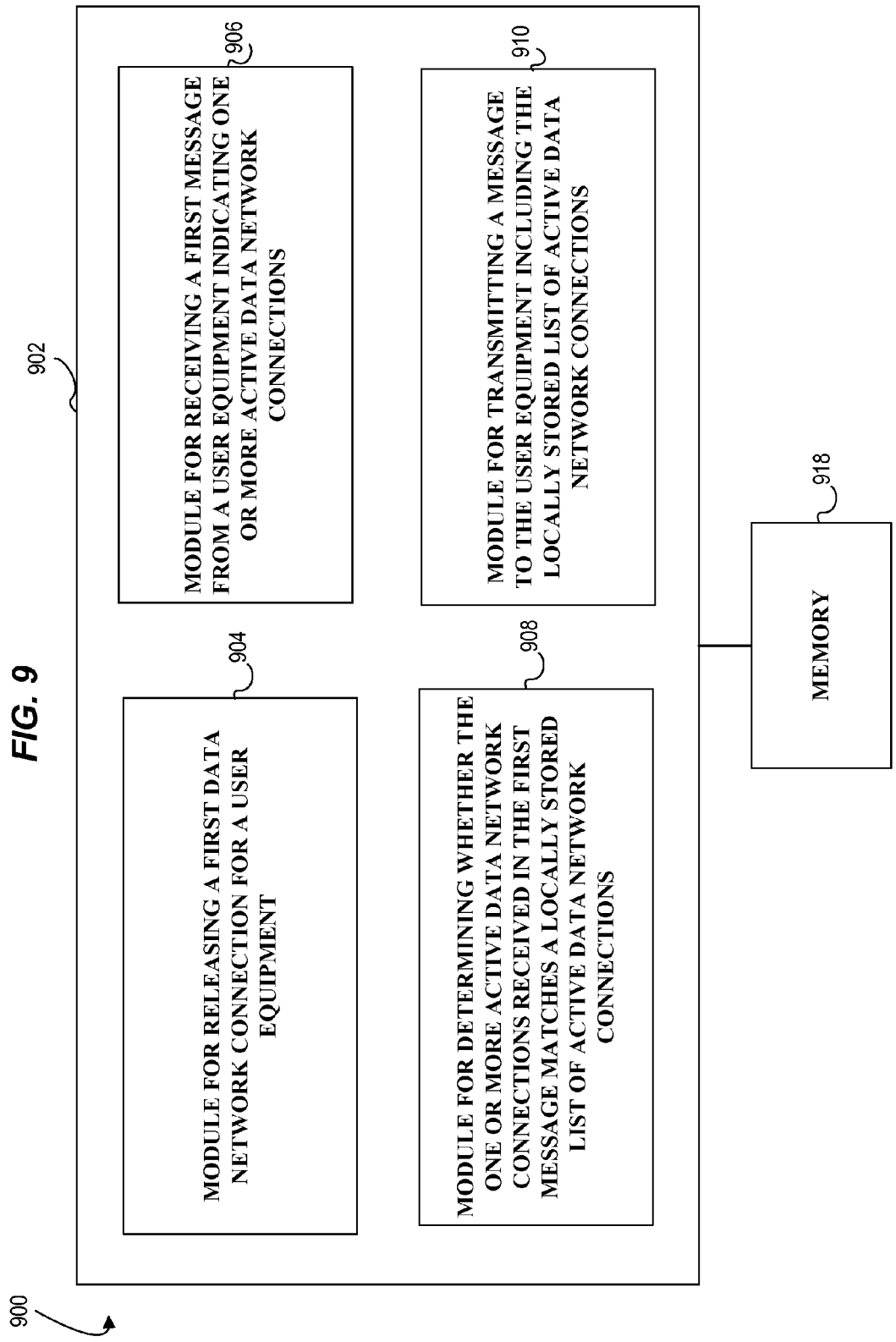

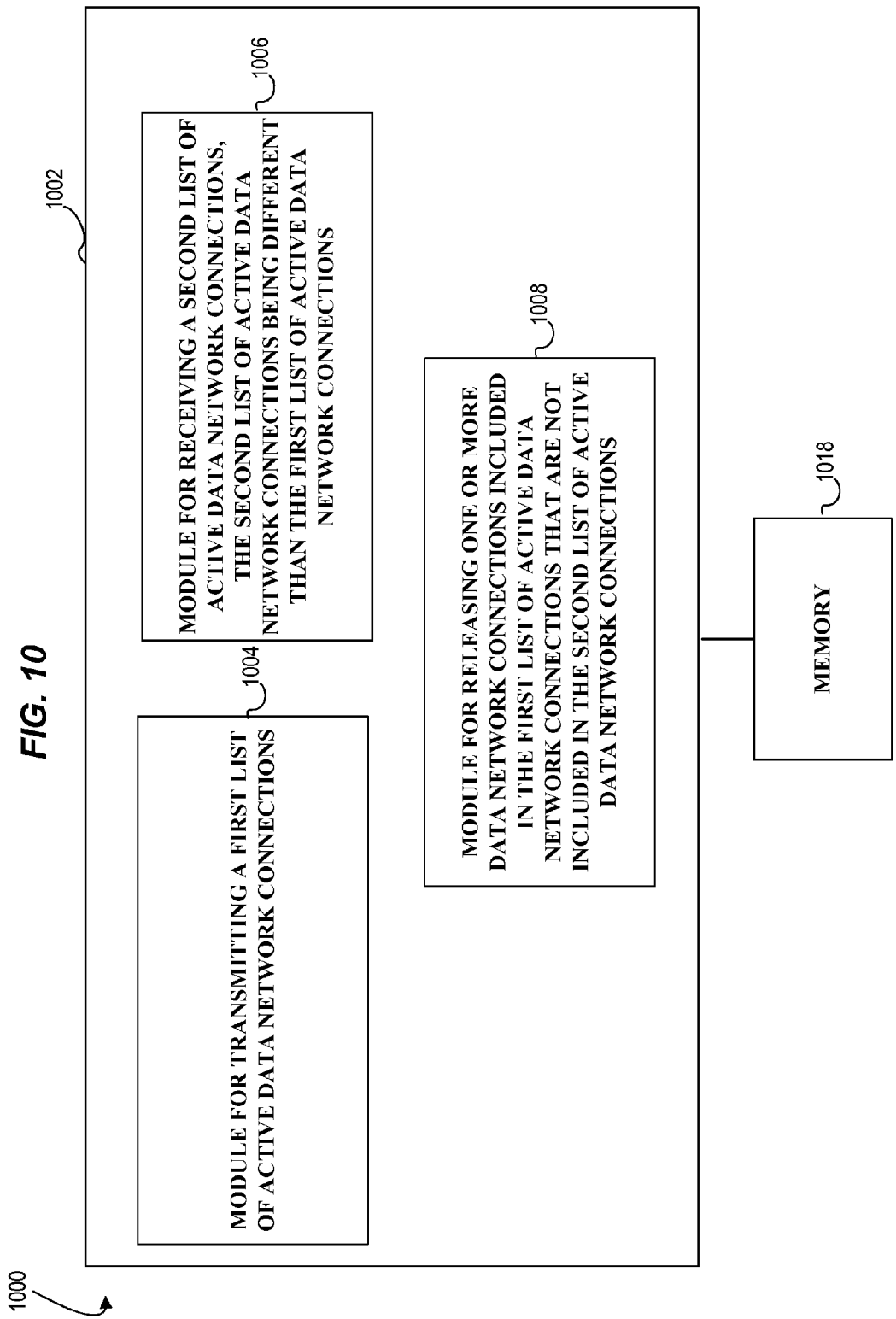

METHOD AND APPARATUS FOR HANDLING STALE PDN CONTEXT

CLAIM OF PRIORITY UNDER 35 U.S.C. §119

The present application for patent claims priority to Provisional Application No. 61/262,876 entitled "Method and Apparatus for handling Stale PDN Context" filed Nov. 19, 2009, and assigned to the assignee hereof and hereby expressly incorporated by reference herein.

BACKGROUND

1. Field

This application relates generally to managing data networks, and more particularly to managing stale data network connections.

2. Background

User equipment (UE), such as mobile devices, may maintain a connection to one or more data networks via a gateway. Mobile devices often move in and out of the coverage area of the gateway. While the mobile device is away from the coverage area, the mobile device may not receive messages, including messages terminating a connection to one or more data networks. The mobile device may also decide to terminate a particular data network connection. However, this may not be communicated to the gateway while the mobile device is outside the coverage area. When the mobile device returns to the coverage area, the mobile device may attempt to communicate with a data network connection that is no longer active, or; the applications on the mobile device may expect to continue to receive the application data. However, if the data network connection has been terminated, these actions will fail. It would be desirable to provide a method for informing the mobile device and/or the gateway of changes to active data network connections.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for managing data network connections comprises releasing a first data network connection for a user equipment; receiving a first message from the user equipment indicating one or more active data network connections; determining whether the one or more active data network connections received in the first message matches a locally stored list of active data network connections; and upon determining that at least one active data network connection in the received first message is not included in the locally stored list of active data network connections, transmitting a message to the user equipment including the locally stored list of active data.

According to some aspects, at least one processor configured to manage data network connections comprises a first module for releasing a first data network connection for a user equipment; a second module for receiving a first message from the user equipment indicating one or more active data network connections; a third module for determining whether the one or more active data network connections received in the first message matches a locally stored list of active data network connections; and a fourth module for, upon determining that at least one active data network connection in the received first message is not included in the locally stored list of active data network connections, transmitting a message to the user equipment including the locally stored list of active data.

According to some aspects, a computer program product comprising a computer-readable medium comprises a first set of codes for causing a computer to release a first data network connection for a user equipment; a second set of codes for causing the computer to receive a first message from the user equipment indicating one or more active data network connections; a third set of codes for causing the computer to determine whether the one or more active data network connections received in the first message matches a locally stored list of active data network connections; and a fourth set of codes for causing the computer to, upon determining that at least one active data network connection in the received first message is not included in the locally stored list of active data network connections, transmit a message to the user equipment including the locally stored list of active data.

According to some aspects, an apparatus comprises means for releasing a first data network connection for a user equipment; means for receiving a first message from the user equipment indicating one or more active data network connections; means for determining whether the one or more active data network connections received in the first message matches a locally stored list of active data network connections; and means for, upon determining that at least one active data network connection in the received first message is not included in the locally stored list of active data network connections, transmit a message to the user equipment including the locally stored list of active data.

According to some aspects, an apparatus comprises a receiver configured to receive a request to release a first data network connection for a user equipment; and a processor configured to release the first data network connection, receive a first message from the user equipment indicating one or more active data network connections, determine whether the one or more active data network connections received in the first message matches a locally stored list of active data network connections, and to, upon determining that at least one active data network connection in the received first message is not included in the locally stored list of active data network connections, transmit a message to the user equipment including the locally stored list of active data.

According to some aspects, a method for managing data network connections comprises transmitting a first list of active data network connections; receiving, from a gateway, a second list of active data connections, the second list of active data connections being different than the first list of active data connections; and releasing one or more data connection networks included in the first list of active data network connections that are not included in the second list of active data connections.

According to some aspects, at least one processor configured to manage data network connections comprises a first module for transmitting a first list of active data network connections; a second module for receiving, from a gateway, a second list of active data connections, the second list of active data connections being different than the first list of active data connections; and a third module for releasing one or more data connection networks included in the first list of active data network connections that are not included in the second list of active data connections.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 9 depicts a system for managing data network connections, in accordance with various described aspects; and FIG. 10 depicts another system for managing data network connections, in accordance with various described aspects.

DETAILED DESCRIPTION

Figure 1:
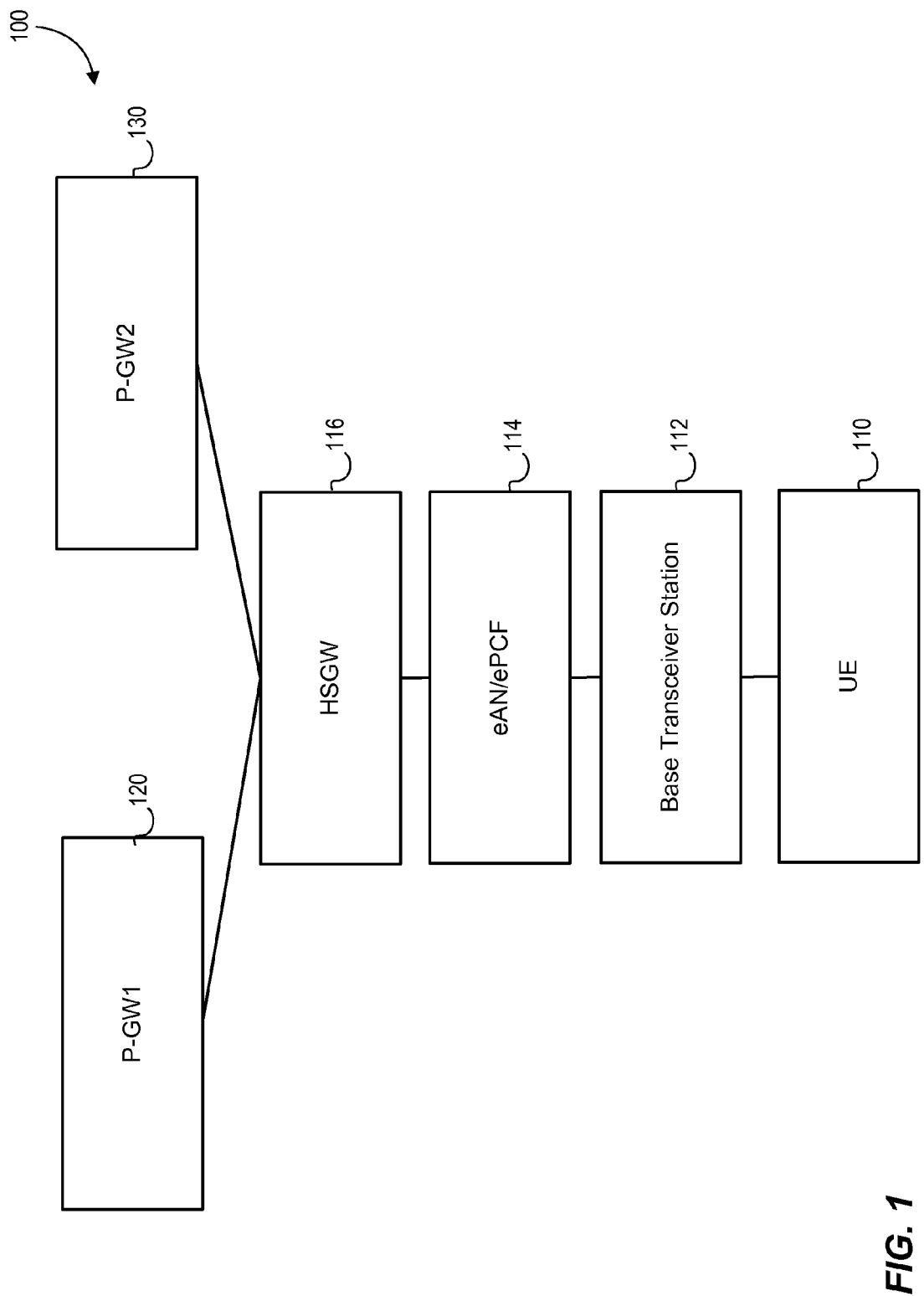
FIG. 1 is a high-level network block diagram.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Methods and apparatus are described herein for handling stale network connection information. User equipment, such as mobile devices, often move in and out of a coverage area. As such, the user equipment may not be informed of a lost or terminated data connection. Upon returning to a network connection, the user equipment may make failed attempts to transmit data via a lost or terminated connection. The methods and apparatus described herein provide mechanisms for informing the user equipment of outdated network connection data. Likewise, a user equipment may terminate a particular network connection but fail to inform the gateway of the termination. As such, the gateway has stale network connectivity data. The methods and apparatus described herein also provide mechanisms for informing a gateway of stale network connectivity information.

FIG. 1 depicts a high level block diagram of a network topology 100 that may be used in various aspects of the invention disclosed herein. Exemplary network 100 supports evolved High Rate Packet Data (eHRPD). However, the present invention is not limited to eHRPD networks. The apparatus and methods described herein may be equally applied to other network types such as, for example, Long Term Evolution (LTE) networks. As shown in FIG. 1, user equipment (UE) 110 communicates with a base transceiver station 112, which in turn provides transceiver functionality to the user equipment 110 and is controlled by an evolved Access Network/evolved Packet Control Function (eAN/ePCF) 114. The eAN/ePCF 114 controls conversions between the air interface and the access network. HRPD serving gateway (HSGW) 116 facilitates connections between UE 110 and one or more Packet Data Network (PDN) gateways (P-GWs), such as P-GW1 120 and P-GW2 130.

When UE 110 connects to the network, it associates with a P-GW, which in turn provides data forwarding to UE 110 as UE 110 roams on the network. UE 110 can connect to multiple P-GWs, such as P-GW1 120 and P-GW2 130. UE 110 may also connect to multiple networks using the same P-GW, and can create a separate PDN connection for each network. UE 110 and HSGW 116 maintain separate lists of active PDN connections for UE 110.

Figure 2:
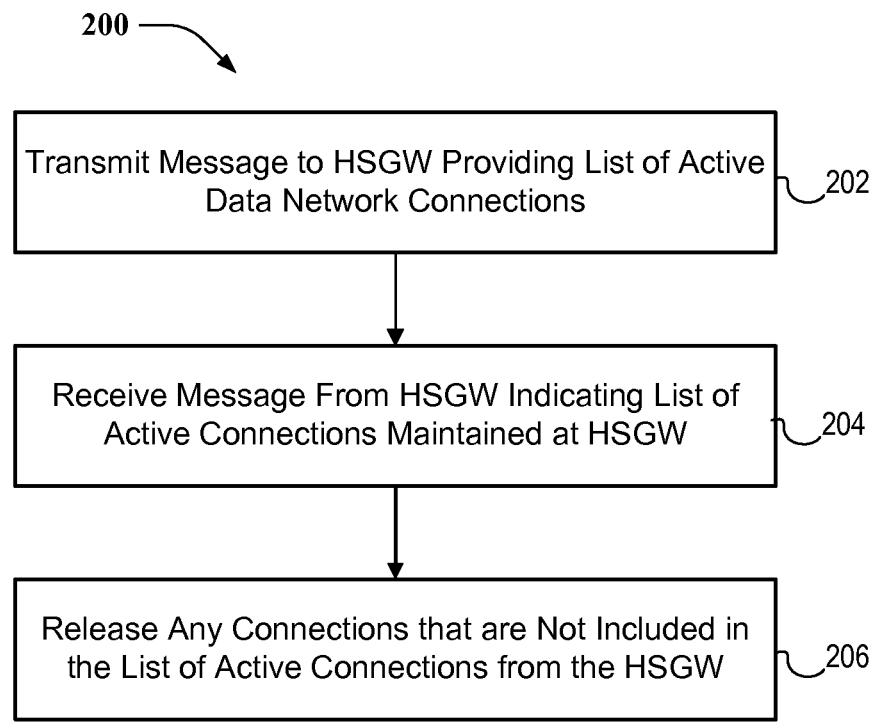
FIG. 2 is a flowchart depicting an exemplary method of managing data network connections.

Turning now to FIG. 2, a high level flowchart depicting a method 200 for managing stale network connectivity data is provided. Method 200 may be implemented, for example, by UE 110. As depicted at 202, UE 110 may transmit a message to HSGW 116 providing its list of active data network connections, such as active PDN connections. For example, UE 110 may have gone outside the HSGW 116 network coverage area and recently returned. In accordance with some aspects, the message may be a data message to the HSGW 116 indicating that one or more applications operating on UE 110 want to send data to a particular PDN. The data message may be sent, for example, via a VSNP packet/PDN-Mux packet. In other aspects, the message may be a simple message from UE 110 indicating its presence after being away for a while. This message may be sent, for example, as an link control protocol (LCP) echo request message with newly added fields to include PDN IDs. Other message types may also be transmitted that provide a list of active PDN connections for UE 110.

As depicted at 204, UE 110 may receive a message from HSGW 116 indicating the list of active connections for UE 110 that has been maintained at HSGW 116. While UE 110 was out of the network coverage area, one or more PDN connections to UE 110 may have been lost or terminated. As such, the list of active connections transmitted by HSGW 116 may differ from the list maintained and transmitted by UE 110, as UE 100 may not have been informed of connection terminations while away from the network. As depicted at 206, UE 110 may release any connections included in its list that are not in the list of active network connections transmitted by HSGW 116. The UE 110 may release the PDN connection either locally or by sending a VSNCP-Terminate-Request.

Figure 3:
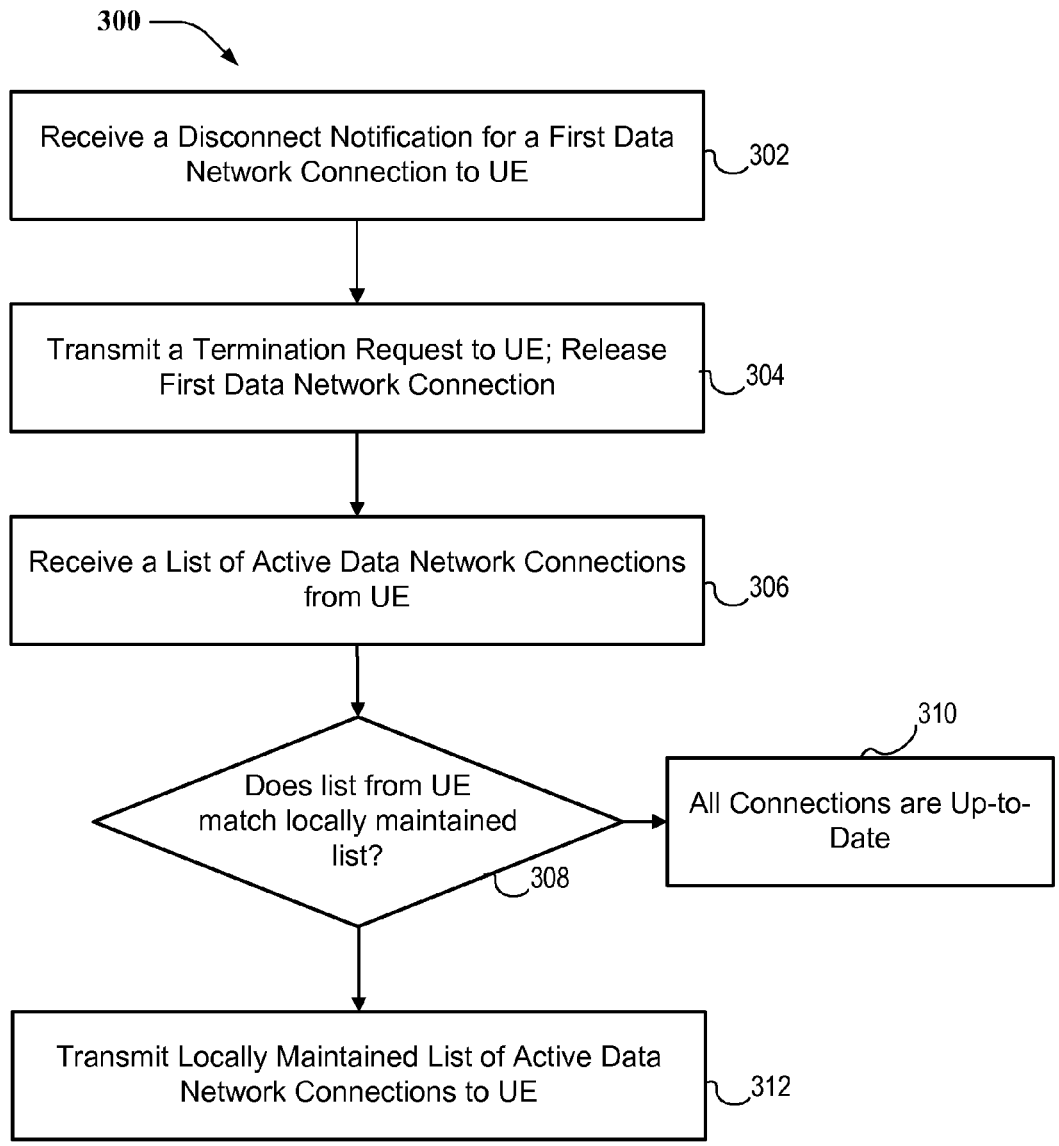
FIG. 3 is flowchart depicted another exemplary method of managing data network connections.

FIG. 3 is another high level flowchart depicting a method 300 for managing state network connectivity data. Method 300 may be implemented, for example, by HSGW 116. As depicted at 302, HSGW 116 may receive a disconnect notification from a gateway, such as a PDN gateway to which UE 110 has an active PDN connection. The message may indicate that the PDN wishes to terminate a particular PDN connection to UE 110. As depicted at 304, HSGW 116 may transmit a termination request to UE 110 and release the connection indicated in the disconnect notification. However, if UE 110 is out of the coverage area when HSGW 116 transmits the termination request, UE 110 may not receive the message. As such, when UE 110 returns to the network, UE 110 may assume that all previously active connections are still connected. As depicted at 306, HSGW 116 receives a message from UE 110 indicating its active data network connections. As described above, the message may be a data connection message or an LCP echo request message with fields to include PDN IDs. Other message types may also be transmitted. As depicted at 308, HSGW 116 determines whether the list of active data network connections received from UE 110 matches a locally maintained list of active data network connections for the UE. If the lists match, all connections are up-to-date, as depicted at 310. If not, HSGW 116 transmits the locally maintained list of active data network connections to UE 110, as depicted at 312.

Figure 4:
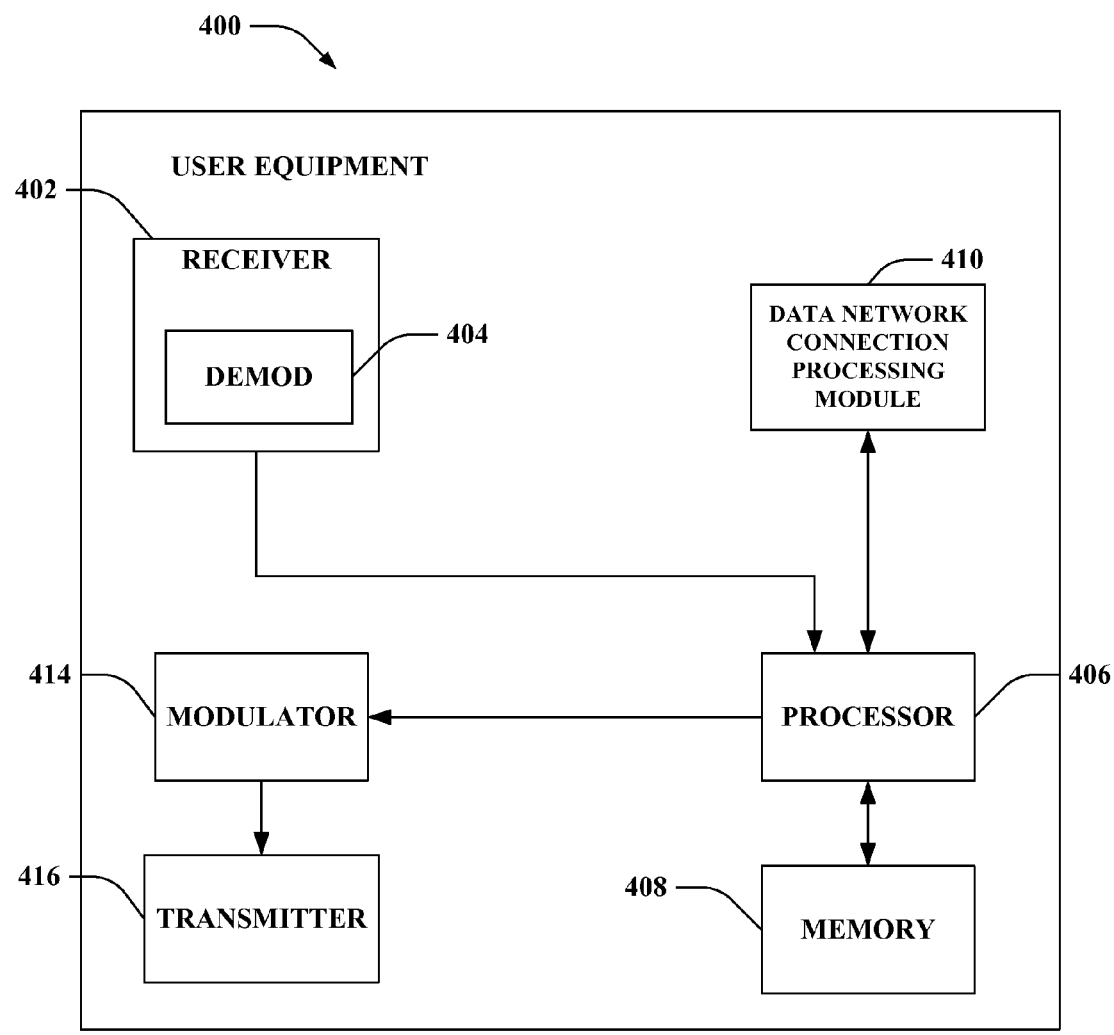
FIG. 4 is a block diagram of a user equipment, in accordance with various disclosed aspects.

Turning now to FIG. 4, a UE 400 that facilitates management of active data networks is depicted. UE 400 comprises a receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to a processor 406 for channel estimation. Processor 406 can be a processor dedicated to analyzing information received by receiver 402 and/or generating information for transmission by a transmitter 416, a processor that controls one or more components of mobile device 400, and/or a processor that both analyzes information received by receiver 402, generates information for transmission by transmitter 416, and controls one or more components of UE 400.

UE 400 can additionally comprise memory 408 that is operatively coupled to processor 406 and that can store data to be transmitted, received data, information related to active data network connections and any other suitable information managing active data network connections and communicating via the channel.

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 of the subject systems and methods is intended to comprise, without being limited to, these and any other suitable types of memory.

Processor 406 can further be operatively coupled to a data network connection processing module 410, which may be configured to manage data network connections for the UE 400. For example, data network connection processing module 410 may be configured to track active connections to one or more packet data networks. Data network connection processing module 410 may also be configured to transmit messages that include an identifier associated with each active data network connection. Messages may include, for example, an LCP echo request that is sent upon receipt of a message identifying a data network connection that data network connection processing module 410 does not recognize as active, or that advertises the presence of UE 400 on the network after the UE returns to the network coverage area. Although depicted as being separate from the processor 406, it is to be appreciated that data network connection processing module 410, demodulator 404, and/or modulator 414 can be part of the processor 406 or multiple processors (not shown).

Figure 5:
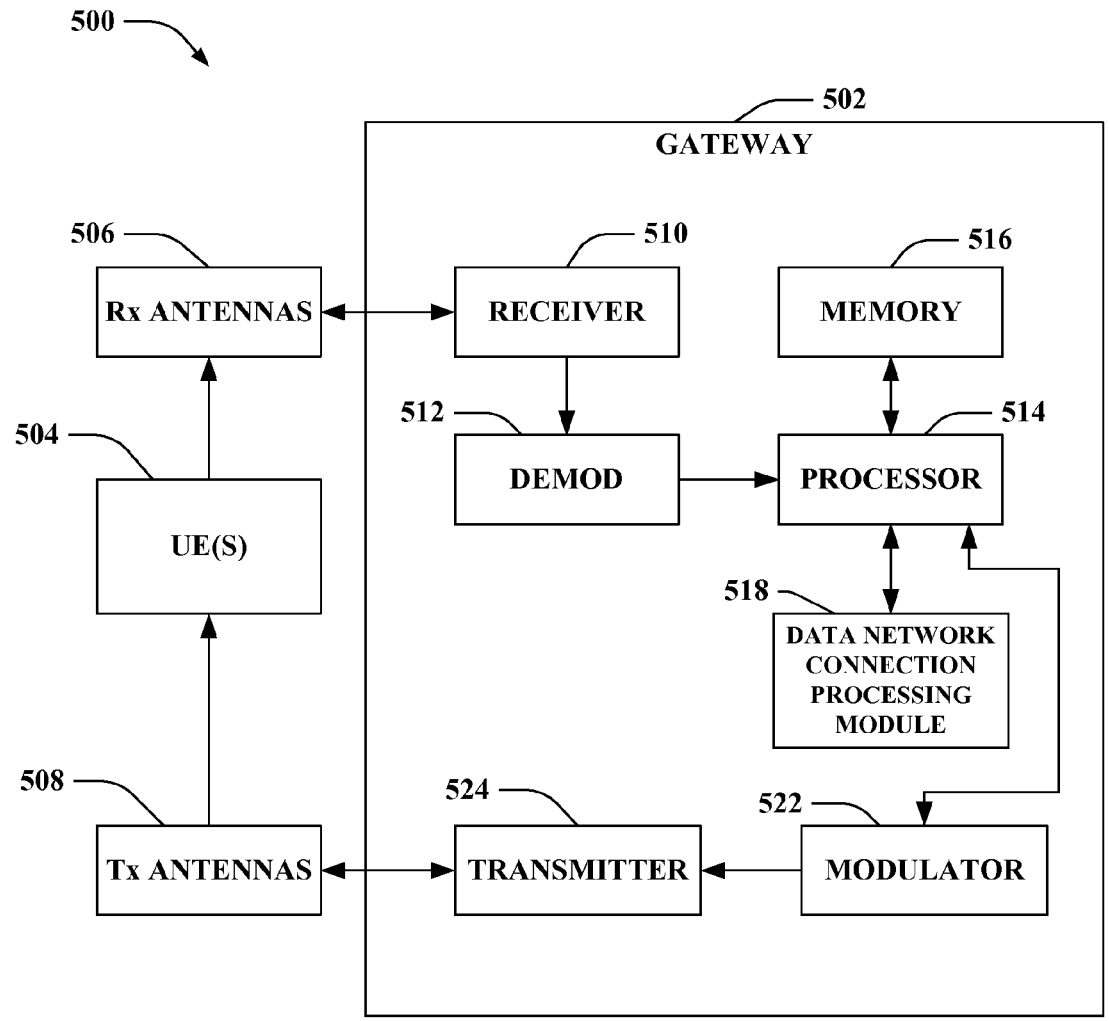
FIG. 5 is a block diagram of a gateway, in accordance with various disclosed aspects.

FIG. 5 is an illustration of a system 500 that facilitates management of data network connections. The system 500 comprises a gateway 502 (e.g., access point, femtocell, . . . ) with a receiver 510 that receives signal(s) from one or more UEs 504 through a plurality of receive antennas 506, and a transmitter 524, operatively associated with a modulator 522, that transmits to the one or more UEs 504 through a transmit antenna 508. Receiver 510 can receive information from receive antennas 506 and is operatively associated with a demodulator 512 that demodulates received information. Demodulated symbols are analyzed by a processor 514 that can be similar to the processor described above with regard to FIG. 4, and which is coupled to a memory 516 that stores information related to facilitating management of data network connections, data to be transmitted to or received from mobile device(s) 504 (or a disparate base station (not shown)), and/or any other suitable information related to performing the various actions and functions set forth herein.

Gateway 502 may also include a data network connection processing module 518 that facilitates data network connections between UEs, such as mobile devices 504, and one or more data networks. Data network connection processing module 518 maintains a list of active data network connections for each connected UE. Data network connection processing module 518 may also be configured to receive termination requests from the one or more data networks and/or from a UE to terminate a particular connection. Data network connection processing module 518 may also be configured to compare active data network connection information received from a UE to the locally stored active data network connection information in order to determine whether the UE is maintaining any stale connections.

Figure 6:
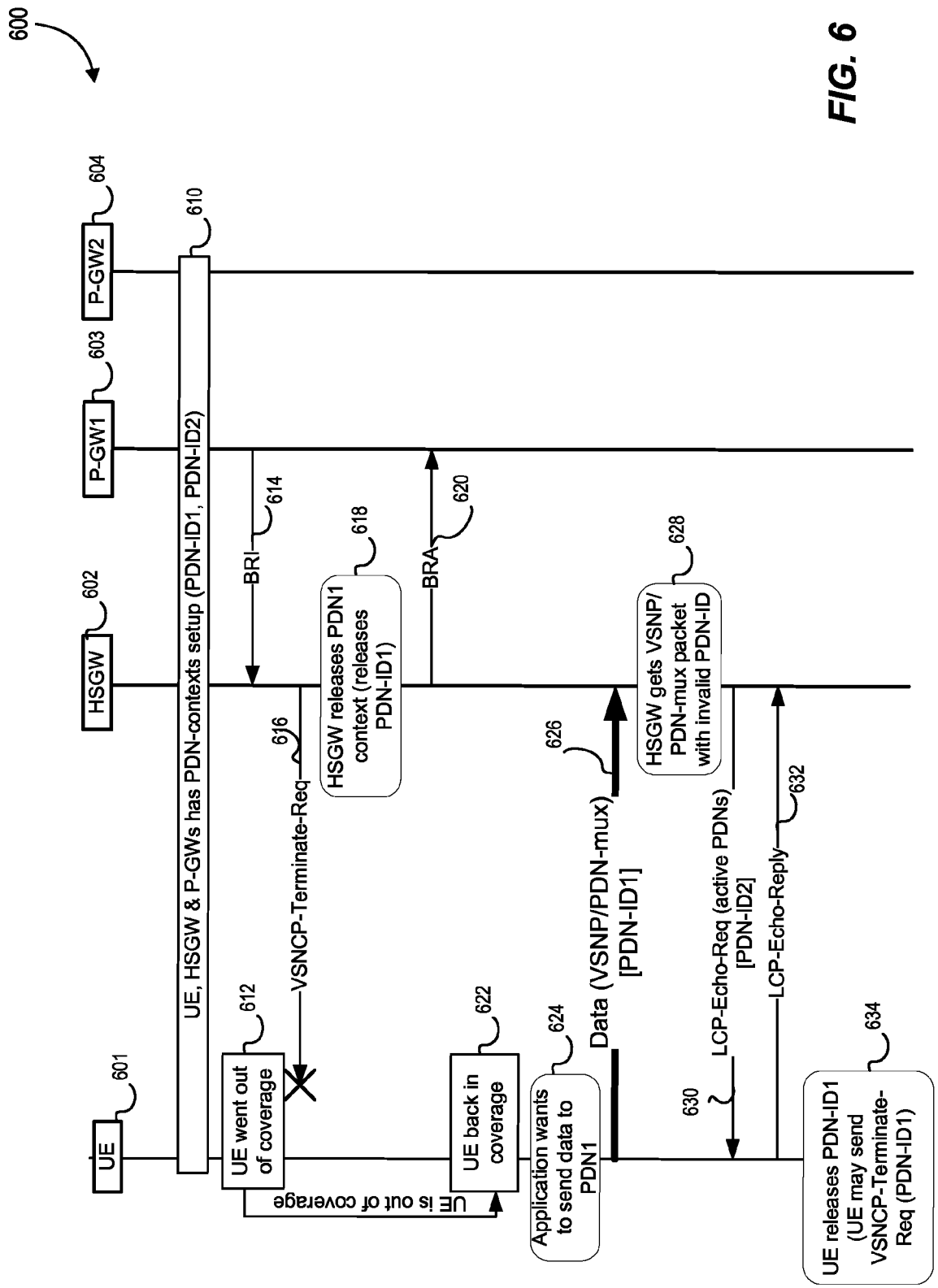
FIGS. 6-8 are message flow diagrams depicting exemplary message exchanges, in accordance with various disclosed aspects.

FIG. 6 depicts an exemplary call flow 600 indicating communications between a UE 601, and HSGW 602, a P-GW1 603, and a P-GW2 604 related to releasing a stale PDN context. As depicted at 610, UE 601, HSGW 602, P-GW1 603, and P-GW2 604 may have multiple established PDN connections setup, such as, for example, PDN-ID1 and PDN-ID2. In some implementations, PDN-ID1 may be associated with P-GW1 603 and PDN-ID2 may be associated with P-GW2 604. However, as described above, a single P-GW may establish multiple PDN connections. As such, both PDN-ID1 and PDN-ID2 may be associated with the same P-GW.

As depicted at 612, UE 601 goes outside the coverage area of HSGW 602 at some time after the establishment of the PDN connections. As depicted at 614, P-GW1 603 transmits a binding revocation indicator (BRI) to HSGW 602 to disconnect itself from UE 601 from the perspective of PDN-ID1. HSGW 602 attempts to disconnect a PDN connection identified using PDN-ID1 with UE 610, as depicted at 616. For example, HSGW 602 may transmit a VSNCP-Terminate-Req messages to UE 601. However, because UE 601 is outside the coverage area, the message is not received by UE 601. As depicted at 618, HSGW 602 then releases the PDN connection identified using PDN-ID1, and sends a binding revocation acknowledgment (BRA) informing P-GW1 603 that the connection as been disconnected, as depicted at 620.

UE 601 may come back into the network coverage area, as depicted at 622, and may have an application that wants to send data to the PDN connection identified using PDN-ID1, as depicted at 624. Because UE 601 was outside the coverage area when the message terminating PDN connection identified using the PDN-ID1 was transmitted, UE 601 is unaware that the connection to the PDN identified using PDN-ID1 has been terminated. As depicted at 626, UE 601 sends data directed to PDN-ID1 to HSGW 602. The message identifies PDN-ID1 as an active PDN, and may be transmitted, for example, as a VSNP/PDN-mux message. As depicted at 628, HSGW 602 receives the data packet having an invalid PDN-ID. In response, HSGW 602 transmits a message to UE 610 informing UE 601 that PDN-ID2 is the only remaining active PDN, as depicted at 630. This message may be, for example, an LCP echo request message used to announce active PDNs. As depicted at 632, the UE replies with an LCP echo reply, and as depicted at 634, releases PDN-ID1. In some aspects, UE 601 may send a VSNCP-Terminate Request message to HSGW 602.

Figure 7:
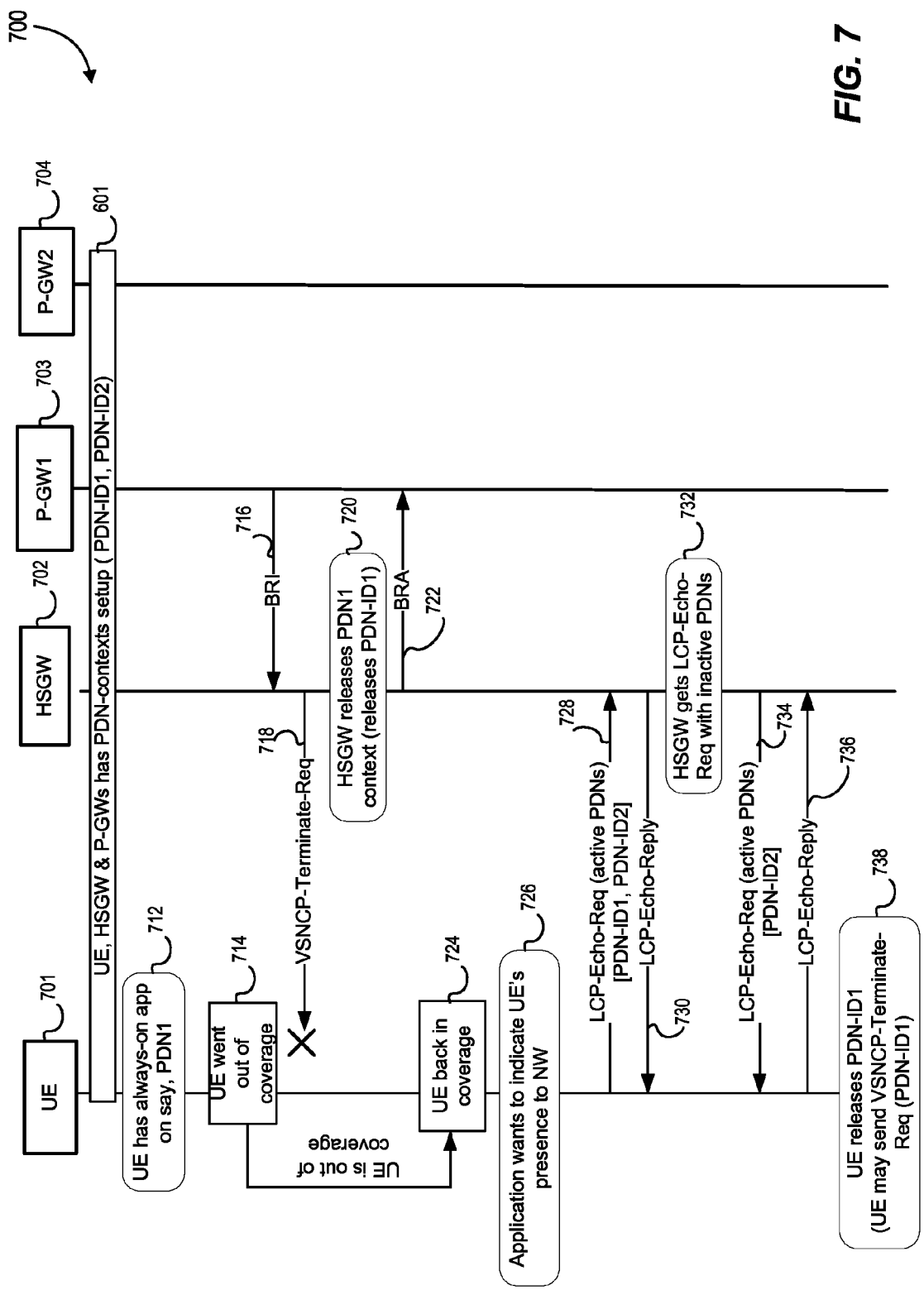

FIG. 7 depicts an exemplary call flow 700 wherein a UE 701 may autonomously send an active PDN indicator to HSGW 702. As depicted at 710, UE 701, HSGW 702, P-GW1 703, and P-GW2 704 may have multiple established PDN connections setup, such as, for example, PDN-ID1 and PDN-ID2. As depicted at 712, UE 701 may have an application that has an "always-on" connection to PDN-ID1. For example, an email account may be associated with PDN-ID1. As depicted at 714, UE 701 goes outside the coverage area of HSGW 702 at some time after the establishment of the PDN connections.

As depicted at 716, P-GW1 703 transmits a binding revocation indicator (BRI) to HSGW 702 to disconnect itself from UE 701 from the perspective of PDN-ID1. HSGW 702 attempts to inform UE 701 of the termination of PDN-ID1, as depicted at 718. For example, HSGW 702 may transmit a VSNCP-Terminate-Req messages to UE 701. However, because UE 701 is outside the coverage area, the message is not received by UE 701. As depicted at 720, HSGW 602 then releases the PDN-ID1, and sends a binding revocation acknowledgment (BRA) informing P-GW1 703 that the connection as been disconnected, as depicted at 722.

As depicted at 724, UE 701 comes back into the coverage area. UE 701 may have been expecting email messages that were not receives while outside the coverage area. The email application on UE 701 may wish to indicate the UE's presence on the network, as depicted at 726. As such, UE 701 may transmit an LCP echo request to HSGW 702, as depicted at 728, advertising its active PDNs as PDN-ID1 and PDN-ID2. HSGW 702 replies, as depicted at 730, indicating receipt of the LCP echo request. The UE may send the message to the network on a periodic basis, with a timer, whose value is pre-configured in the UE.

As depicted at 732, HSGW 702 notes that the LCP echo request from UE 701 contains inactive PDNs. HSGW 702 may then transmit an LCP echo request indicating that the PDN connection identified using PDN-ID2 is the only active PDN, as depicted at 734. As depicted at 736, the UE replies with an LCP echo reply, and as depicted at 738, releases PDN-ID1. In some aspects, UE 701 may send a VSNCP-Terminate Request message to HSGW 702.

Figure 8:
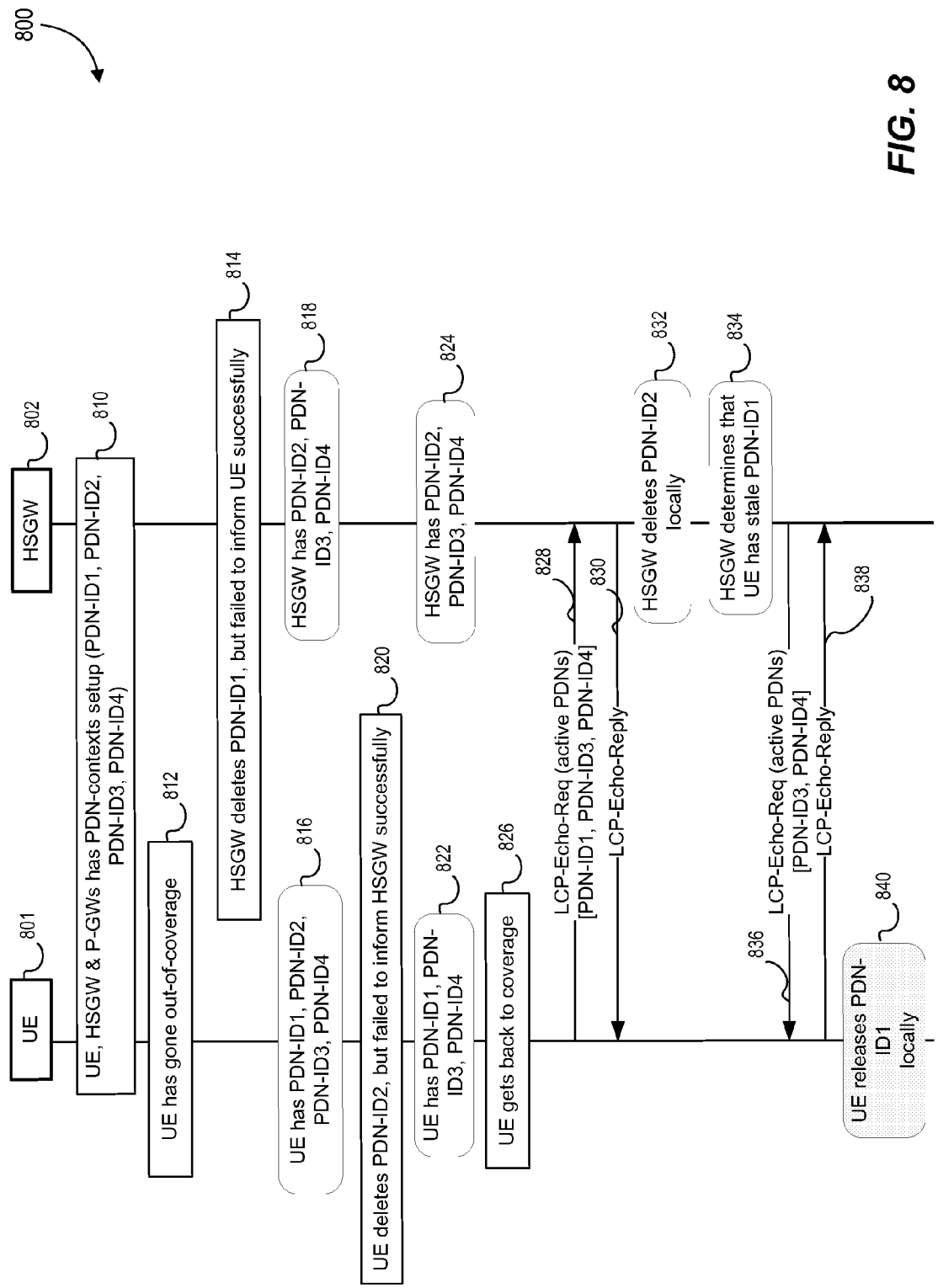

Referring now to FIG. 8, an exemplary call flow diagram 800 is presented showing communications between UE 801 and HSGW 802. In this implementation, both UE 801 and HSGW 802 are informed of stale PDN connectivity data. As depicted at 810, UE 801, HSGW 802, and one or more P-GWs have multiple PDN connections established, such as PDN-ID1, PDN-ID2, PDN-ID3, and PDN-ID4. As depicted at 812, UE 801 goes outside the network coverage area. While UE 801 is outside the network coverage area, HSGW 802 deletes the PDN connection identified using PDN-ID1, but is unable to inform UE 801 of the termination, as depicted at 814. The steps of terminating the PDN connection identified using PDN-ID1 and attempting to inform UE of the termination may be performed in a manner similar to that shown in steps 616 of FIG. 6 or steps 718 of FIG. 7.

Though HSGW has deleted the PDN connection identified using PDN-ID1, UE still has the PDN connections identified using PDN-ID1, PDN-ID2, PDN-ID3, and PDN-ID4 stored as active PDNs, as depicted at 816, since UE 801 did not receive notification of the termination of the PDN connection identified using PDN-ID1. As depicted at 818, after the termination of the PDN connection identified using PDN-ID1, HSGW 802 has PDN-ID2, PDN-ID3, and PDN-ID4 as active PDNs. As depicted at 820, UE 801 may delete PDN-ID2, but fail to successfully inform HSGW 802 of this deletion. Accordingly, as depicted at 822, after the deletion of PDN-ID2, UE 801 has PDN-ID1, PDN-ID3, and PDN-ID4 as active PDNs. Because HSGW 802 was not informed that PDN-ID2 was deleted by UE 801, HSGW 802 continues to store PDN-ID2, PDN-ID3, and PDN-ID4 as active PDNs, as depicted at 824.

As depicted at 826, UE 801 returns to the network coverage area, and sends a message advertising its active PDNs as PDN-ID1, PDN-ID3, and PDN-ID4, as depicted at 828. The message may be, for example, an LCP echo request message, a data message, or some other message that includes an advertisement of active PDNs. HSGW 802 replies indicting receipt of the message, as depicted at 830.

As depicted at 832, upon comparing its active PDN list to the information provided by UE 801, HSGW 802 recognizes that the PDN connection identified using PDN-ID2 is no longer active for UE 801 and deletes PDN-ID2 locally from its active PDN list for UE 801. HSGW 802 also recognizes that UE 801 has invalid PDN-ID1 indicated as active, as depicted at 834. As depicted at 836, HSGW 802 transmits an LCP echo request message 836 to UE 801 indicating that the only active PDNs are PDN-ID3 and PDN-ID4. UE 801 responds with an LCP echo request, as depicted at 838, and release PDN-ID1 locally, as depicted at 840.

According to some aspects, a receiving entity, such as an HSGW or a UE, may send a VSNCP terminate request message when receiving a packet with the VSNP header or PDN_mux header set to an invalid data network identifier. If the receiving entity continues to receive many packets with the VSNP-header or PDN_mux header set to an invalid data network identifier, the receiving entity may employ a throttling mechanism to regulate the sending of a VSNCP terminate request. For example, a timer or threshold number of invalid packets may be established. Once the timer expires or the threshold is exceeded, the throttling mechanism may send the VSNCP terminate request. According to some aspects, a VSNCP configure request message may be used to renegotiate an invalid data network identifier when a receving entity receives a packet with the VSNP header or PDN_mux header set to an invalid data network identifier.

FIG. 9 depicts a system 900 for managing data network connections. As depicted, system 900 includes functional blocks that can represent functions implemented by a processor, software, or combination thereof (e.g., firmware). System 900 includes a logical grouping 902 of electrical components that act in conjunction. System 900 may be implemented, for example, by a gateway.

Logical grouping 902 can include a module for releasing a first data network connection for a user equipment 904. Moreover, logical grouping 902 can include a module for receiving a first message from the user equipment indicating one or more active data network connections 906. Logical group 902 may further include a module for determining whether the one or more active data network connections received in the first message matches a locally stored list of active data network connections 908; and a module for, upon determining that at least one active data network connection in the received first message is not included in the locally stored list of active data network connections, transmitting a message to the user equipment including the locally stored list of active data network connections 910. Additionally, system 900 can include a memory 918 that retains instructions for executing functions associated with electrical components 904-910. While shown as being external to memory 918, it is to be understood that electrical components 904-910 can exist within memory 918.

FIG. 10 depicts another system 100 for managing data network connections. As depicted, system 1000 includes functional blocks that can represent functions implemented by a processor, software, or combination thereof (e.g., firmware). System 1000 includes a logical grouping 1002 of electrical components that act in conjunction. System 1000 may be implemented, for example, by a UE.

Logical grouping 1002 can include a module for transmitting a first list of active data network connections 1004. Moreover, logical grouping 1002 can include a module for receiving, from a gateway, a second list of active data network connections, the second list of active data network connections being different than the first list of active data network connections 1006. Logical group 902 may further include a module for releasing one or more data network connections included in the first list of active data network connections that are not included in the second list of active data network connections 1008. Additionally, system 1000 can include a memory 1018 that retains instructions for executing functions associated with electrical components 1004-1008. While shown as being external to memory 1018, it is to be understood that electrical components 1004-1008 can exist within memory 1018.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing data network connections, comprising:
    releasing, by a network entity, a first data network connection for a user equipment;
    receiving, by the network entity, a first message from the user equipment indicating one or more active data network connections, wherein the one or more active data network connections were activated prior to the receiving;
    determining, by the network entity, whether a locally stored list of active data network connections is stale by determining whether the one or more active data network connections received in the first message matches the locally stored list of active data network connections; and
    upon determining that the locally stored list is stale based on determining that at least one active data network connection in the received first message is not included in the locally stored list of active data network connections, transmitting, by the network entity, a message to the user equipment including the locally stored list of active data network connections for the user equipment.

2. The method of claim 1, wherein the first message from the user equipment is a message transmitting data to one of the one or more active data network connections included in the received first message, and
    wherein the one of the one or more active data network connections is not included in the locally stored list of active data network connections.

3. The method of claim 1, wherein the first message from the user equipment is a presence indication message.

4. The method of claim 3, wherein the presence indication message is transmitted autonomously by the user equipment upon return of the user equipment to a network coverage area.

5. The method of claim 3, wherein the presence indication message is a link control protocol (LCP) echo request message extended to include identifiers representing the one or more active data network connections from the first message.

6. The method of claim 1, further comprising:
    determining that the locally stored list of active data network connections is stale by determining that at least one active data network connection included in the locally stored list of active data network connections is not included in the first message from the user equipment; and
    locally deleting the at least one active data network connection from the locally stored list of active data network connections, wherein upon the locally deleting, the locally stored list is no longer stale.

7. The method of claim 1,
    wherein the first message from the user equipment is a message transmitting data to the first data network connection, and
    wherein the first data network connection is not included in the locally stored list of active data network connections because the first data network connection was released by the network entity.

8. At least one processor configured to manage data network connections, comprising:
    a first module for releasing, at a network entity, a first data network connection for a user equipment;
    a second module for receiving, at the network entity a first message from the user equipment indicating one or more active data network connections, wherein the one or more active data network connections were activated prior to the receiving;
    a third module for determining, at the network entity, whether a locally stored list of active data network connections is stale by determining whether the one or more active data network connections received in the first message matches the locally stored list of active data network connections; and a fourth module for, upon determining that the locally stored list is stale based on determining that at least one active data network connection in the received first message is not included in the list of active data network connections, transmitting, at the network entity, a message to the user equipment including the locally stored list of active data network connections for the user equipment.

9. A computer program product, comprising:
a non-transitory computer-readable medium comprising:
   a first set of codes for causing a computer to release, at a network entity, a first data network connection for a user equipment;
   a second set of codes for causing the computer to receive, at the network entity, a first message from the user equipment indicating one or more active data network connections, wherein the one or more active data network connections were activated prior to the first message being received;
   a third set of codes for causing the computer to determine, at the network entity, whether a locally stored list of active data network connections is stale by determining whether the one or more active data network connections received in the first message matches the locally stored list of active data network connections; and
   a fourth set of codes for causing the computer to, upon determining that the locally stored list is stale based on determining that at least one active data network connection in the received first message is not included in the locally stored list of active data network connections, transmit, at the network entity, a message to the user equipment including the locally stored list of active data network connections for the user equipment.

10. An apparatus, comprising:
means for releasing, at a network entity, a first data network connection for a user equipment;
means for receiving, at the network entity, a first message from the user equipment indicating one or more active data network connections, wherein the one or more active data network connections were activated prior to the receiving;
means for determining, at the network entity, whether a locally stored list of active data network connections is stale by determining whether the one or more active data network connections received in the first message matches the locally stored list of active data network connections; and
means for, upon determining that the locally stored list is stale based on determining that at least one active data network connection in the received first message is not included in the locally stored list of active data network connections, transmitting, at the network entity, a message to the user equipment including the locally stored list of active data network connections for the user equipment.

11. An apparatus associated with a network entity, comprising:
a receiver configured to receive a request to release a first data network connection for a user equipment; and
a processor configured to:
   release, at the network entity, the first data network connection,
   receive, at the network entity, a first message from the user equipment indicating one or more active data network connections, wherein the one or more active data network connections were activated prior to the first message being received,
   determine, at the network entity, whether a locally stored list of active data network connections is stale by determining whether the one or more active data network connections received in the first message matches the locally stored list of active data network connections, and
   upon determining that the locally stored list of active data network connections is stale based on determining that at least one active data network connection in the received first message is not included in the locally stored list of active data network connections, transmit, at the network entity, a message to the user equipment including the locally stored list of active data network connections for the user equipment.

12. The apparatus of claim 11, wherein the first message from the user equipment is a message transmitting data to one of the one or more active data network connection connections included in the received first message, and
   wherein the one of the one or more active data network connections is not included in the locally stored list of active data network connections.

13. The apparatus of claim 11, wherein the first message from the user equipment is presence indication message.

14. The apparatus of claim 13, wherein the processor is further configured to autonomously send the presence indication message upon return of the apparatus to a network coverage area.

15. The apparatus of claim 13, wherein the presence indication message is a link control protocol (LCP) echo request message extended to including identifiers representing the one or more active data network connections in the first message.

16. The apparatus of claim 11, further wherein the processor is further configured to:
   determine that the locally stored list of active data network connections is stale by determining that at least one active data network connection included in the locally stored list of active data network connections is not included in the first message from the user equipment; and
   locally delete the at least one active data network connection from the locally stored list of active data network connections, wherein upon the locally deleting, the locally stored list is no longer stale.

17. The apparatus of claim 11,
   wherein the first message from the user equipment is a message transmitting data to the first data network connection, and
   wherein the first data network connection is not included in the locally stored list of active data network connections because the first data network connection was released by the network entity.

18. A method for managing data network connections, comprising:
   transmitting, by a user equipment, a first list of active data network connections;
   receiving, by the user equipment from a gateway, a second list of active data network connections, the second list of active data network connections being different than the first list of active data network connections;
   determining, by the user equipment, that the first list of active data network connections is stale based on determining that one or more active data network connections included in the first list of active data network connections are not included in the second list of active data network connections; and releasing, by the user one or more active data network connections included in the first list of active data network connections that are not included in the second list of active data network connections.

19. The method of claim 18, wherein the first list of active data network connections is transmitted, by the user equipment, in a message transmitting data to at least one of the one or more active data network connections included in the first list of active data network connections but not in the second list of active data network connections.

20. The method of claim 18, wherein the first list of active data network connections is transmitted in a presence indication message.

21. The method of claim 20, wherein the presence indication message is a link control protocol (LCP) echo request message extended to include identifiers associated with each active data network connection in the first list of active data network connections.

22. At least one processor configured to manage data network connections, comprising:
    a first module for transmitting, at a user equipment, a first list of active data network connections;
    a second module for receiving, at the user equipment from a gateway, a second list of active data network connections, the second list of active data network connections being different than the first list of active data network connections;
    a third module for determining, at the user equipment, that the first list of active data network connections is stale based on determining that one or more active data network connections included in the first list of active data network connections are not included in the second list of active data network connections; and
    a fourth module for releasing, at the user equipment, the one or more active data network connections included in the first list of active data network connections that are not included in the second list of active data network connections.

23. A computer program product, comprising:
    a non-transitory computer-readable medium comprising:
        a first set of codes for causing a computer to transmit, at a user equipment, a first list of active data network connections;
        a second set of codes for causing the computer to receive, at the user equipment from a gateway, a second list of active data network connections, the second list of active data network connections being different than the first list of active data network connections;
        a third set of codes for causing a computer to determine, at the user equipment, that the first list of active data network connections is stale based on determining that one or more active data network connections included in the first list of active data network connections are not included in the second list of active data network connections; and
        a fourth set of codes for causing the computer to release, at the user equipment, one or more active data networks connections included in the first list of active data network connections that are not included in the second list of active data network connections.

24. An apparatus, comprising:
    means for transmitting, at the user equipment, a first list of active data network connections;
    means for receiving, at the user equipment from a gateway, a second list of active data network connections, the second list of active data network connections being different than the first list of active data connections;
    means for determining, at the user equipment, that the first list of active data network connections is stale based on determining that one or more active data network connections included in the first list of active data network connections are not included in the second list of active data network connections; and
    means for releasing, at the user equipment, one or more active data network connections included in the first list of active data network connections that are not included in the second list of active data network connections.

25. An apparatus associated with a user equipment, comprising:
    a transmitter configured to transmit, by the user equipment, a first list of active data network connections; and
    a processor configured to:
        receive, by the user equipment, a second list of active data network connections, the second list of active data network connections being different than the first list of active data network connections,
        determine, by the user equipment, that the first list of active data network connections is stale based on determining that one or more active data network connections included in the first list of active data network connections are not included in the second list of active data network connections, and
        release, by the user equipment, one or more active data network connections included in the first list of active data network connections that are not included in the second list of active data network connections.

26. The apparatus of claim 25, wherein the first list of active data network connections is transmitted, by the user equipment, in a message transmitting data to at least one of the one or more active data network connections included in the first list of active data network connections but not in the second list of active data network connections.

27. The apparatus of claim 25, wherein the first list of active data network connections is transmitted in a presence indication message.

28. The apparatus of claim 27, wherein the presence indication message is a link control protocol (LCP) echo request message extended to include identifiers representing each of the active data network connections in the first list of active data network connections.

* * * * *